(12) United States Patent
Chen (10) Patent No.: US 8,790,765 B2
(45) Date of Patent: Jul. 29, 2014

(54) PAD STRUCTURE FOR ABSORBING VIBRATION AND DISPERSING PRESSURE

(75) Inventor: Fu-Chieng Chen, Taipei (TW)

(73) Assignee: Fomosa Sounding Corp., Taipei (TW)

( * ) Notice: Subject to any disclaimer, the term of this patent is extended or adjusted under 35 U.S.C. 154(b) by 220 days.

(21) Appl. No.: 13/330,192

(22) Filed: Dec. 19, 2011

(65) Prior Publication Data

US 2013/0156990 A1   Jun. 20, 2013

(51) Int. Cl.
*B32B 3/24* (2006.01)

(52) U.S. Cl.
USPC ............... 428/138; 428/117; 428/139; 5/723; 5/729; 5/740

(58) Field of Classification Search
USPC ............... 428/138, 139, 117; 5/723, 729, 740
See application file for complete search history.

(56) References Cited

U.S. PATENT DOCUMENTS

| | | | |
|---|---|---|---|
| 7,865,989 B2 * | 1/2011 | Steppat et al. | 5/740 |
| 2006/0162082 A1 * | 7/2006 | Kawahara et al. | 5/655.9 |
| 2011/0154576 A1 * | 6/2011 | Warren et al. | 5/740 |

* cited by examiner

*Primary Examiner* — William P Watkins, III
(74) *Attorney, Agent, or Firm* — Ming Chow; Sinorica, LLC (57) ABSTRACT

A pad structure for absorbing vibration and dispersing pressure comprises: an absorbing and dispersing layer, at least one surface of which is a closed surface, at least one connecting hole is disposed on, the one end surface of the connecting hole is an opened surface and the other is a closed surface; at least one positioning member, which has an adhering surface connecting the positioning member into the connecting hole, the one end surface of the positioning member is urged by the connecting hole, adhering agent is coated on the adhering surface; a buffering layer, which has at least one connecting surface connecting with the surface, the adhering surface being on, of the absorbing and dispersing layer, the connecting surface and the adhering surface are tightly combined to fix the absorbing and dispersing layer; and a wrapping member, which covers on the absorbing and dispersing layer and the buffering layer.

16 Claims, 8 Drawing Sheets

PAD STRUCTURE FOR ABSORBING VIBRATION AND DISPERSING PRESSURE

BACKGROUND OF THE INVENTION

1. Field of the Invention

The present invention generally relates to a pad structure for absorbing vibration and dispersing pressure, more particularly to a pad structure that continuously disperses pressure and then an end user may not touch the bottom while on the pad structure, the pad structure has better support, softness, to permeability, etc. and can be applied to mattress, cushion, foot pad, or car mat.

2. Description of the Prior Art

Nowadays, one of the structures of current mattress, cushion, foot pad, or car mat is that a gel layer covers on a foam layer and the foam layer is sealed by an overcoat, so that the weight of an end user can be dispersed by the gel layer and the foam layer while the end user is on the mattress, cushion, foot pad, or car mat. For the factor of the gel layer and the foam layer accepting average pressure, a structure with a whole and big area is designed, but such product, a non-gap structure, has the disadvantage of lower permeability, and a lot more cost for materials should be enough in order to manufacture the big area mattress. On the other hand, the weight is highly increased as well since the foam material is applied for the whole and big area. Then it causes another high cost, the delivery cost, except for the problem of more loading of carrying persons handling mattress, cushion, foot pad, or car mat. More, for the end user changing a new one, not only that the weight causes the problem of hard movement, but also that the whole structure can not be folded.

Since it is over soft, the whole gel structure may be sunk to touch the bottom while the end user is on the mattress, cushion, foot pad, or car mat. Continuously, such sinking condition makes that turning the body over is not very easily, and that is, to the effect of supporting may not be good.

To improve above disadvantages, the inventor filed a patent application in Taiwan, Republic of China, on Feb. 22, 2011, the application number is 100203115. For the patent application, the absorbing and dispersing layer and the buffering layer cannot be tightly combined together, therefore the absorbing and dispersing layer may be moved or deformed while in moving and cannot be in the state of lamination.

SUMMARY OF THE INVENTION

The main objective of the present invention is to provide a pad structure for absorbing vibration and dispersing pressure, that is, the absorbing and dispersing layer has several positioning members, and the buffering layer and the positioning member are made by the same material, the buffering layer and the positioning member can be tightly combined, and non-toxic adhering agent is adapted to avoid pungent odor and environmental pollution.

The second objective of the present invention is to provide the pad structure for absorbing vibration and dispersing pressure, that is, through the positioning members, the absorbing and dispersing layer may not be moved or deformed while in moving or coiling in order to be in the state of lamination.

A pad structure for absorbing vibration and dispersing pressure comprises an absorbing and dispersing layer, at least one positioning member, a buffering layer, and a wrapping member; wherein at least one surface of the absorbing and dispersing layer is a closed surface, at least one connecting hole is disposed on the absorbing and dispersing layer, the one end surface of the connecting hole is an opened surface and the other end surface being a closed surface; the positioning member has an adhering surface that connects the positioning member into the connecting hole of the absorbing and dispersing layer, so that the one end surface of the positioning member is urged by the connecting hole, adhering agent is coated on the adhering surface; the buffering layer has at least one connecting surface that connects with the surface, the adhering surface of the positioning member being on, of the absorbing and dispersing layer, so that the connecting surface and the adhering surface are tightly combined and then the absorbing and dispersing layer is fixed; and the wrapping member covers on the absorbing and dispersing layer and the buffering layer as one member.

Further, the connecting hole of the absorbing and dispersing layer is passed through the absorbing and dispersing layer, so that the two end surfaces of the connecting hole are opened surfaces, the two end surfaces of the positioning member are two adhering surfaces, hence the two end surfaces of the absorbing and dispersing layer provide two buffering layers in order to form a sandwich structure.

Preferably, a plurality of traverse flexible supporting walls and a plurality of longitudinal flexible supporting walls are disposed on the absorbing and dispersing layer and cross composed a frame member so as to have a plurality of cross points, a first oblique flexible supporting wall and a second oblique flexible supporting wall being elongated from the frame member in order to cross compose a flexible supporting structure, wherein the first oblique flexible supporting wall and the second oblique flexible supporting wall are interlaced each other and pass through the cross point, a plurality of radiation holes are formed among the traverse flexible supporting walls, the longitudinal flexible supporting walls, the first oblique flexible supporting walls and the second oblique flexible supporting walls.

Preferably, the cross point of the traverse flexible supporting wall, the longitudinal flexible supporting wall, the first oblique flexible supporting wall and the second oblique flexible supporting wall is round in order to be drawn from pattern.

Preferably, the absorbing and dispersing layer is a solid member.

Preferably, the adhering surface of the positioning member and the surface of the absorbing and dispersing layer are on the same horizontal level or the adhering surface is slightly protruded compared to the surface.

Preferably, the adhering agent is water-soluble or non-toxic.

Preferably, the positioning member is selected from one or the composition of the group consisted of: foam, memory foam, high density foam, natural cotton and rayon.

Preferably, the buffering layer is selected from one or the composition of the group consisted of: foam, memory foam, high density foam, natural cotton and rayon.

Preferably, the wrapping member is selected from one or the composition of the group consisted of: woven fabric, knitted fabric, elastic real leather, artificial leather.

Preferably, the absorbing and dispersing layer is selected from one or the composition of the group consisted of: gel material, latex materials, silicone, soft rubber, synthetic rubber, soft plastic, and soft PU.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Following preferred embodiments and figures will be described in detail so as to achieve aforesaid objects.

Figure 1:
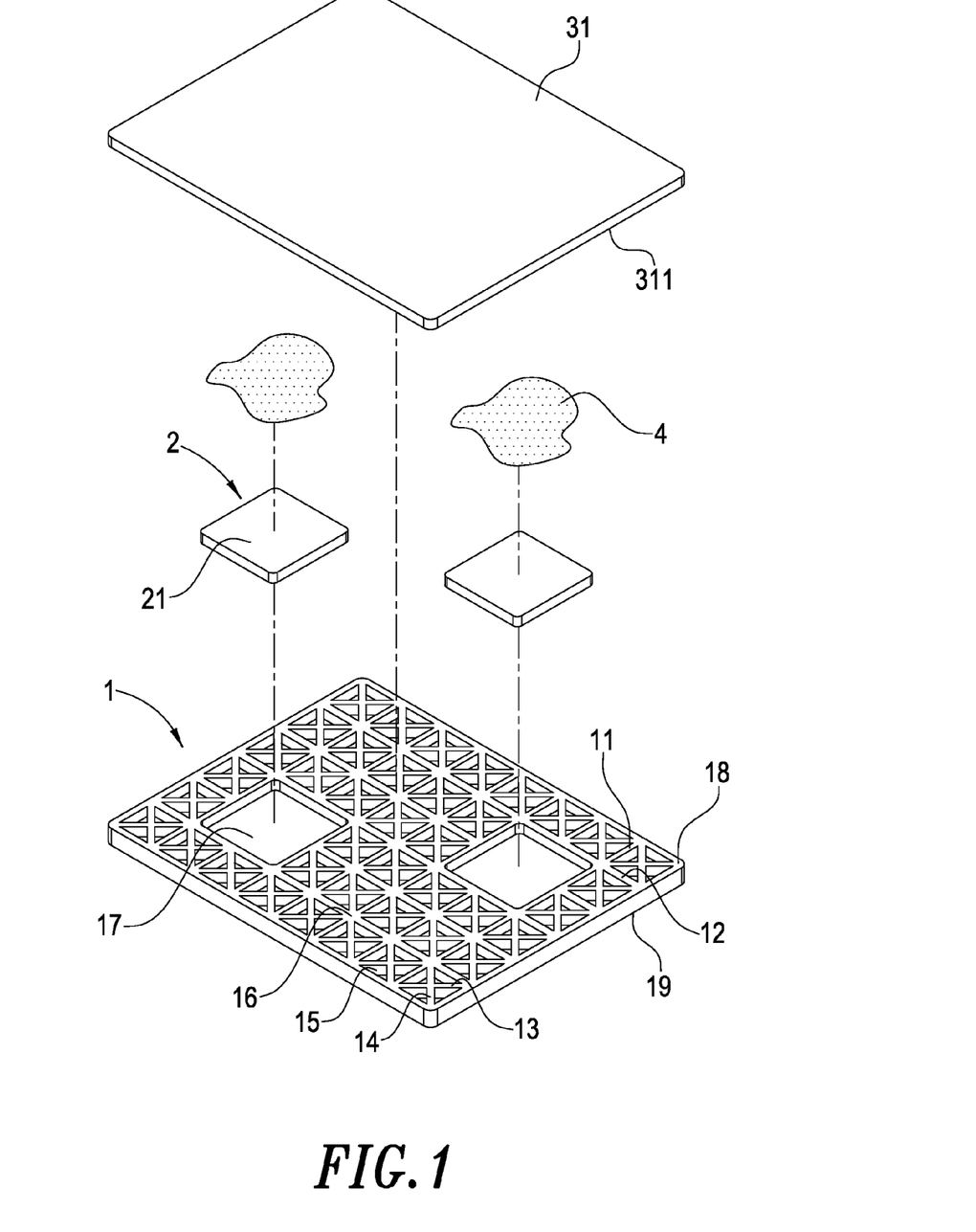
FIG. 1 illustrates a schematic 3D view of a first preferred embodiment of the pad structure for absorbing vibration and dispersing pressure of the present invention.
Figure 2:
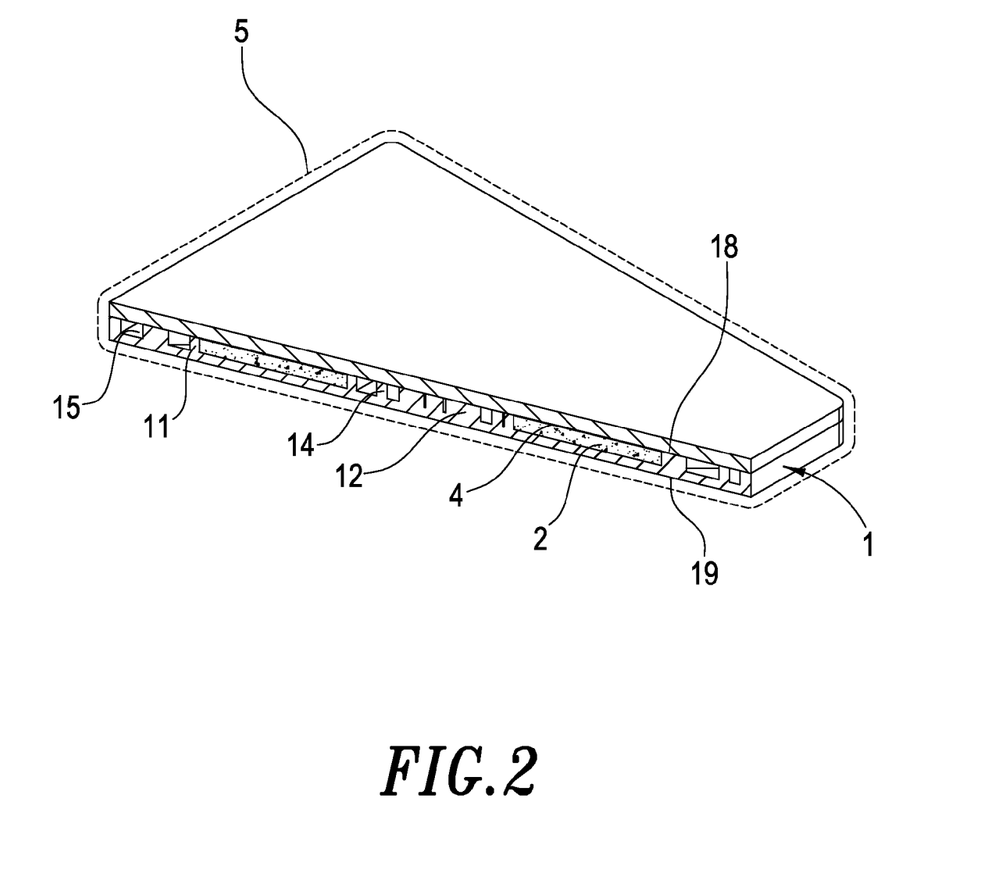
FIG. 2 illustrates a schematic sectional view of the first preferred embodiment of the pad structure for absorbing vibration and dispersing pressure of the present invention.

With references to FIG. 1 and FIG. 2, which illustrates a schematic 3D view of a first preferred embodiment of the pad structure for absorbing vibration and dispersing pressure of the present invention and a schematic sectional view of the first preferred embodiment of the pad structure for absorbing vibration and dispersing pressure of the present invention. The pad structure includes:

an absorbing and dispersing layer 1, which has a first surface 18 and a second surface 19, a plurality of traverse flexible supporting walls 11 and a plurality of longitudinal flexible supporting walls 12 are disposed on the first surface 18 and cross composed a frame member so as to have a plurality of cross points 16, a first oblique flexible supporting wall 13 and a second oblique flexible supporting wall 14 are elongated from the frame member in order to cross compose a flexible supporting structure, wherein the first oblique flexible supporting wall 13 and the second oblique flexible supporting wall 14 are interlaced each other and pass through the cross points 16 of the plurality of traverse flexible supporting walls 11 and longitudinal flexible supporting walls 12, a plurality of radiation holes 15 are formed among the traverse flexible supporting walls 11, the longitudinal flexible supporting walls 12, the first oblique flexible supporting walls 13 and the second oblique flexible supporting walls 14, the second surface 19 is a closed surface, so the radiation hole 15 is not penetrated, two connecting holes 17 are disposed on the absorbing and dispersing layer 1, the connecting hole 17 near the second surface 19 is closed;

at least one positioning member 2, which has at least one adhering surface 21 that connects the positioning member 2 into the connecting hole 17 of the absorbing and dispersing layer 1, so that the one end surface of the positioning member 2 is urged by the connecting hole 17, the adhering surface 21 of the positioning member 2 and the first surface 18 of the absorbing and dispersing layer 1 are on the same horizontal level or the adhering surface 21 is slightly protruded compared to the first surface 18, adhering agent 4 is coated on the adhering surface 21, and the adhering agent 4 is water-soluble or non-toxic, further, the positioning member 2 is selected from one or the composition of the group consisted of: foam, memory foam, high density foam, natural cotton and rayon;

a buffering layer 31, which has at least one connecting surface 311 that connects with the first surface 18 of the absorbing and dispersing layer 1, so that the connecting surface 311 and the adhering surface 21 of the positioning member 2 are tightly combined and then the absorbing and dispersing layer 1 is fixed, more, the absorbing and dispersing layer may not be moved or deformed while in moving or coiling in order to be in the state of lamination; and a wrapping member 5, which covers on the absorbing and dispersing layer 1 and the buffering layer 31 as one member in order to avoid the damages of the absorbing and dispersing layer 1 and the buffering layer 31, besides, the wrapping member 5 is selected from one or the composition of the group consisted of: woven fabric, knitted fabric, elastic real leather, artificial leather.

The buffering layer 31 is selected from one or the composition of the group consisted of: foam, memory foam, high density foam, natural cotton and rayon. Due to that the buffering layer 31 and the positioning member 21 can be made by the same material, the buffering layer 31 and the positioning member 21 can be tightly combined, and non-toxic adhering agent is adapted to avoid pungent odor and environmental pollution.

Preferably, the traverse flexible supporting walls 11, the longitudinal flexible supporting walls 12, the first oblique flexible supporting walls 13 and the second oblique flexible supporting walls 14 are with the features of absorbing vibrations and dispersing impact forces, and traverse flexible supporting walls 11, the longitudinal flexible supporting walls 12, the first oblique flexible supporting walls 13 and the second oblique flexible supporting walls 14 of the absorbing and dispersing layer 1 are selected from one or the composition of the group consisted of: gel material, latex materials, silicone, soft rubber, synthetic rubber, soft plastic, and soft PU.

Preferably, the traverse flexible supporting walls 11, the longitudinal flexible supporting walls 12, the first oblique flexible supporting walls 13 and the second oblique flexible supporting walls 14 are integratedly made.

Preferably, the sides of the traverse flexible supporting walls 11, the longitudinal flexible supporting walls 12, the first oblique flexible supporting walls 13 and the second oblique flexible supporting walls 14 are the same height.

Preferably, the sides of the traverse flexible supporting walls 11, the longitudinal flexible supporting walls 12, the first oblique flexible supporting walls 13 and the second oblique flexible supporting walls 14 are the same width.

While the absorbing and dispersing layer 1 is accepting forces, the traverse flexible supporting wall 11 is able to disperse the forces traverse, the longitudinal flexible supporting wall 12 is able to disperse the forces longitudinally, the first oblique flexible supporting wall 13 and the second oblique flexible supporting wall are able to disperse forces obliquely, hence the forces/pressures are dispersed toward every direction so as to approach outstanding results of buffering and dispersing forces/pressures.

Figure 3:
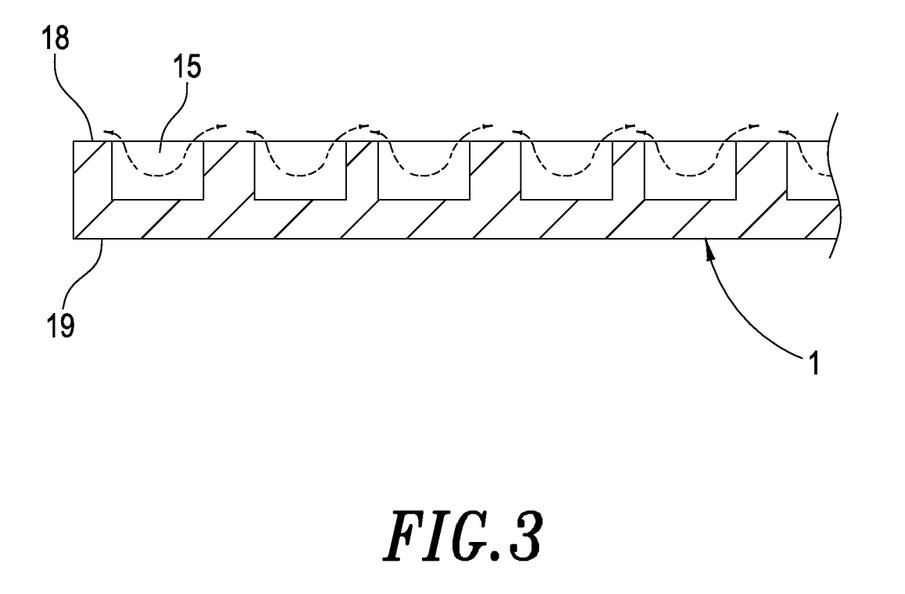
FIG. 3 illustrates a sectional view of the absorbing and dispersing layer of the first preferred embodiment of the present invention.

With reference to FIG. 3, which illustrates a sectional view of the absorbing and dispersing layer of the first preferred embodiment of the present invention. While the first surface 18 and the second surface 19 of the absorbing and dispersing layer 1 are deformed by pressures, air can flow in-and-out through the radiation holes 15, so that the problem of heat radiation can be done.

Figure 4:
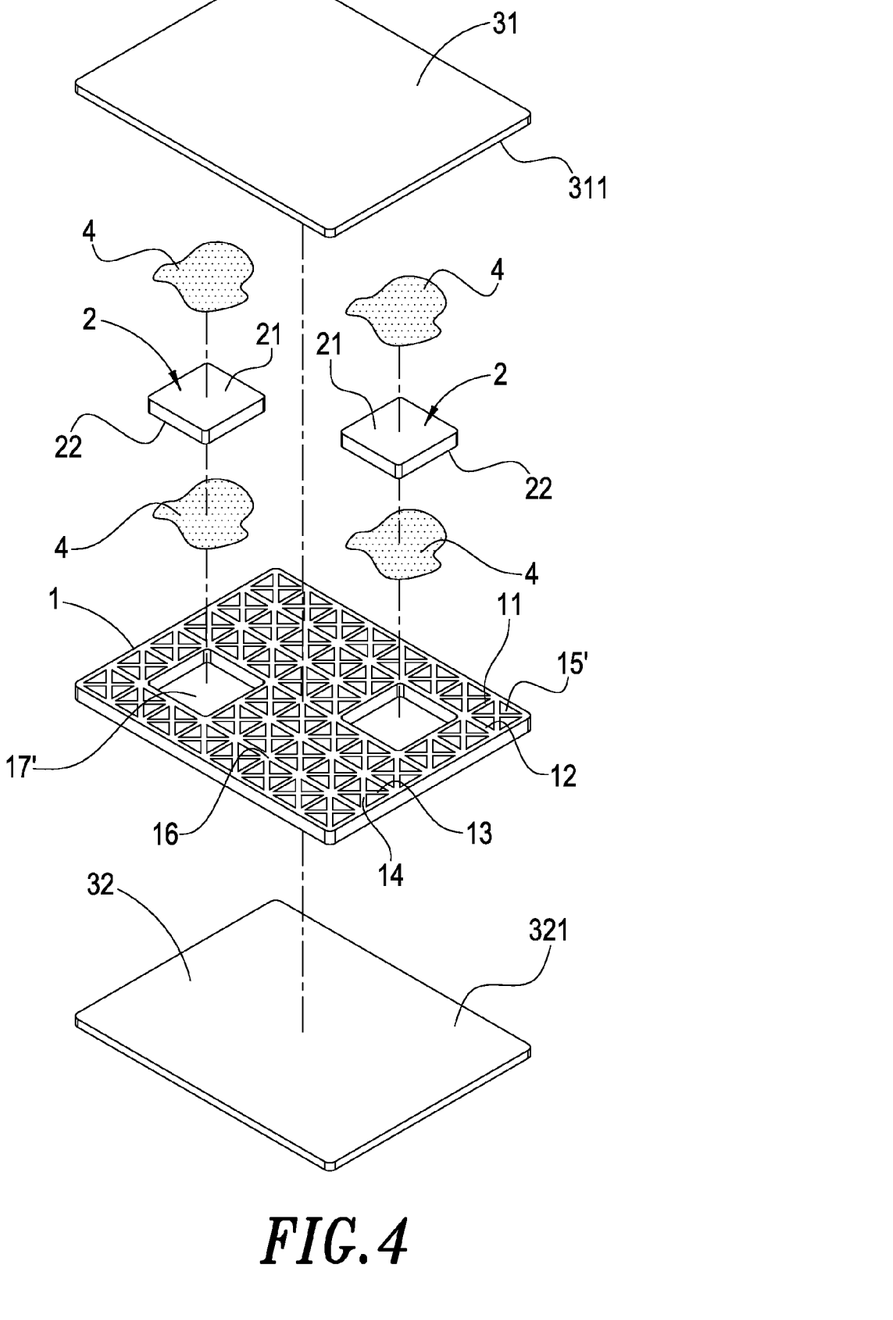
FIG. 4 illustrates a schematic 3D view of a second preferred embodiment of the pad structure for absorbing vibration and dispersing pressure of the present invention.
Figure 5:
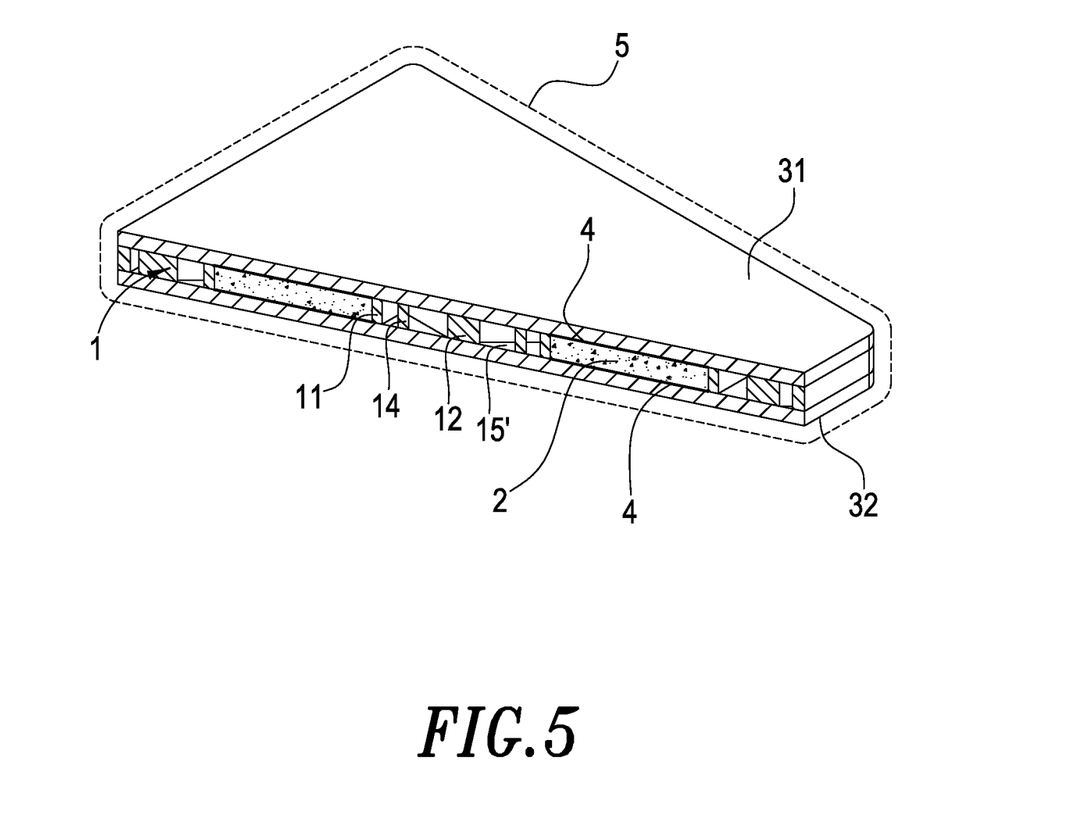
FIG. 5 illustrates a schematic sectional view of the second preferred embodiment of the pad structure for absorbing vibration and dispersing pressure of the present invention.

With references to FIG. 4 and FIG. 5, which illustrates a schematic 3D view of a second preferred embodiment of the pad structure for absorbing vibration and dispersing pressure of the present invention and a schematic sectional view of the second preferred embodiment of the pad structure for absorbing vibration and dispersing pressure of the present invention. The differences between the first preferred embodiment, as shown from FIG. 1 to FIG. 3, and the second preferred embodiment, the second surface 19 of the absorbing and dispersing layer 1 is an opened surface, then the radiation hole 15' and the connecting hole 17' penetrate through the first surface 18 and the second surface 19. The positioning member 2 has two adhering surfaces 21 and 22, the two adhering surfaces 21 and 22 and the first surface 18 and the second surface 19 are on the same horizontal level or the adhering surfaces 21 and 22 are slightly protruded compared to the first surface 18 and the second surface 19. The first surface 18 and the second surface 19 connect with the buffering layers 31 and 32 respectively, and the connecting surfaces 311 and 3212 of the buffering layers 31 and 32 tightly combined with the adhering surfaces 21 and 22 of the positioning member 2 so as to form a structure similar to sandwich. Hence, the absorbing and dispersing layer 1 is fixed by the positioning member 2 without the problem of easily moving and located between the two buffering layer 31 and 32. Others are the same as the first preferred embodiment and will not be described any further hereinafter.

Figure 6:
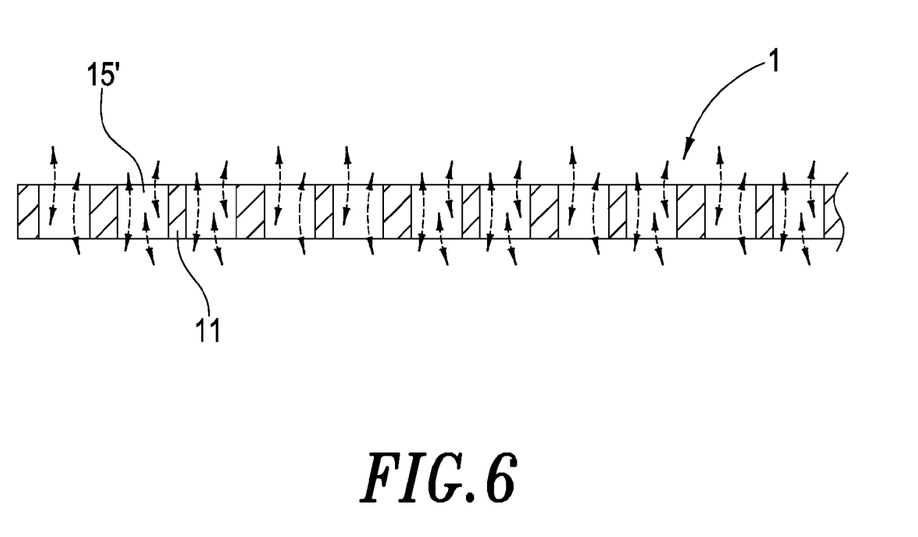
FIG. 6 illustrates a sectional view of the absorbing and dispersing layer of the second preferred embodiment of the present invention.

With reference to FIG. 6, which illustrates a sectional view of the absorbing and dispersing layer of the second preferred embodiment of the present invention. While the first surface 18 and the second surface 19 of the absorbing and dispersing layer 1 are deformed by pressures, air can flow in-and-out through the radiation holes 15', so that the problem of heat radiation can be done.

Figure 7:
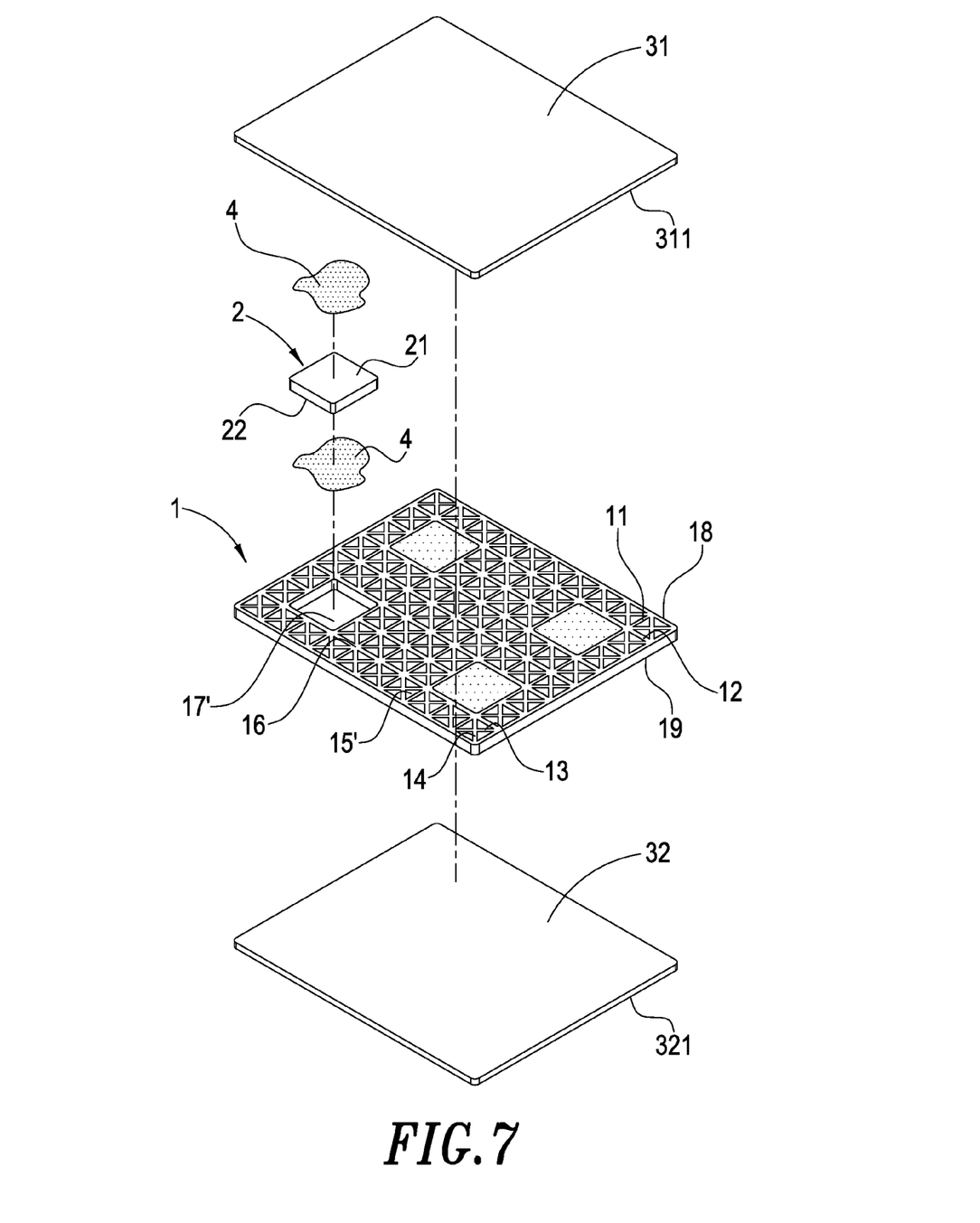
FIG. 7 illustrates a schematic 3D view of a third preferred embodiment of the pad structure for absorbing vibration and dispersing pressure of the present invention.

With references to FIG. 7, which illustrates a schematic 3D view of a third preferred embodiment of the pad structure for absorbing vibration and dispersing pressure of the present invention. The differences among the first preferred embodiment, as shown from FIG. 1 to FIG. 3, the second preferred embodiment, as shown from FIG. 4 to FIG. 6, and the third preferred embodiment are described as following. The connecting holes 17 or 17' can be disposed at the edges of the absorbing and dispersing layer 1, so that the absorbing and dispersing layer 1 is fixed by the positioning member 2 without the problems of the edges being in moving or coiling to cause deforming or moving. Others are the same as the first preferred embodiment and the second preferred embodiment and will not be described any further hereinafter.

Figure 8:
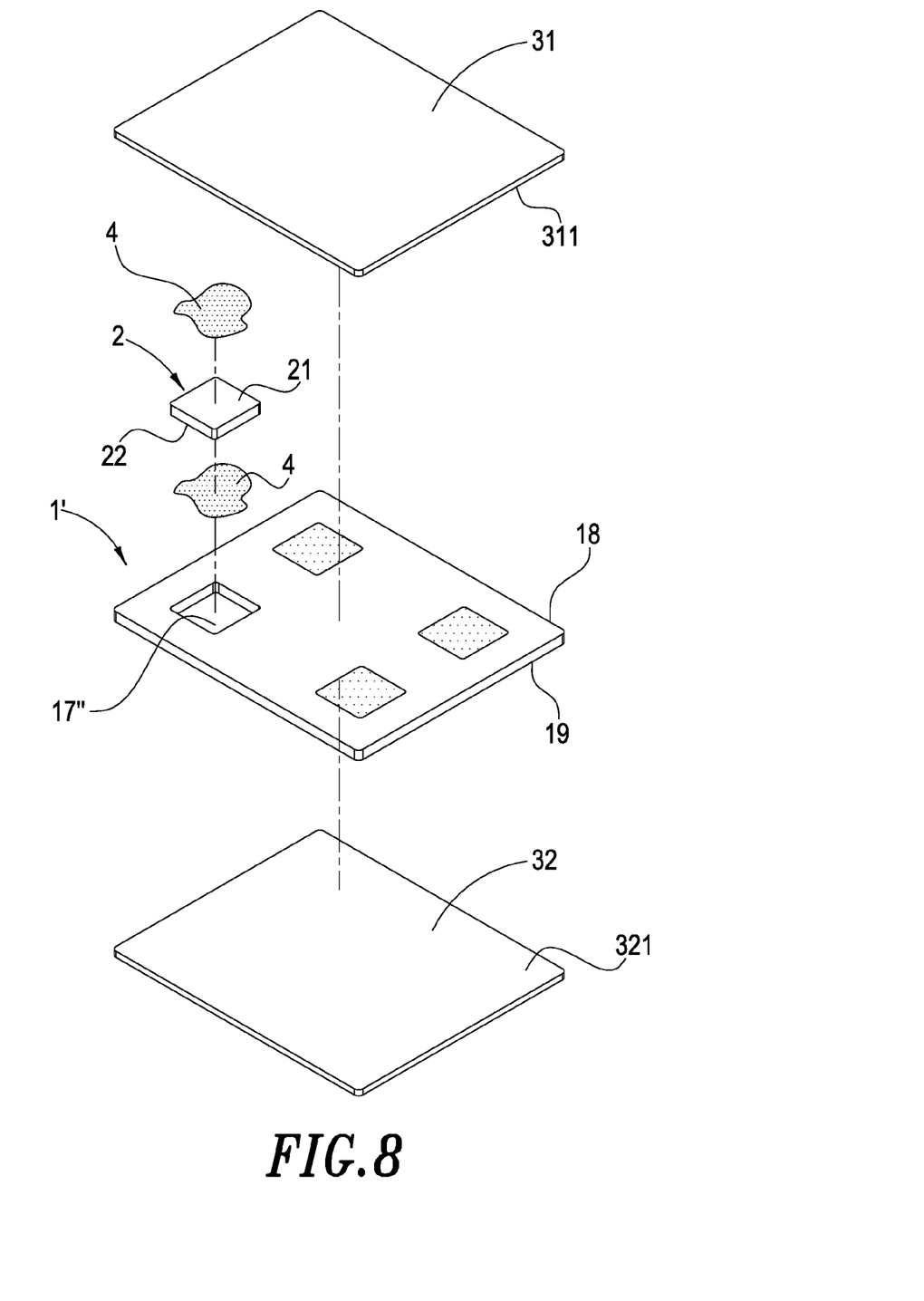
FIG. 8 illustrates a schematic 3D view of a fourth preferred embodiment of the pad structure for absorbing vibration and dispersing pressure of the present invention.

With references to FIG. 8, which illustrates a schematic 3D view of a fourth preferred embodiment of the pad structure for absorbing vibration and dispersing pressure of the present invention. The differences among the first preferred embodiment, as shown from FIG. 1 to FIG. 3, the second preferred embodiment, as shown from FIG. 4 to FIG. 6, and the third preferred embodiment are described as following. The first surface 18 and the second surface 19 of the absorbing and dispersing layer 1 both can be closed surfaces, so that the absorbing and dispersing layer 1 is a solid member; the connecting holes 17" are optionally penetrated or not penetrated. Others are the same as the first preferred embodiment and the second preferred embodiment and to will not be described any further hereinafter.

Aforesaid absorbing and dispersing layers 1 or 1' can be made as mattress, cushion, foot pad, or car mat.

Further, the cross point 16 of the traverse flexible supporting wall 11, the longitudinal flexible supporting wall 12, the first oblique flexible supporting wall 13 and the second oblique flexible supporting wall 14 is round in order to be drawn from pattern.

Compared to prior arts, the of the present invention has following advantages:
1. The present invention provides a structure that is interlaced by several flexible supporting walls, the accepted forces/pressures can be dispersed along every direction. Therefore, such non-face-type pad structure may not need a large number of materials to manufacture the absorbing and dispersing layer, and the manufacturing cost is saved.
2. Except for the advantages of light-weight, cost-saving, etc., the absorbing and dispersing layer has several radiation holes so as to let air pass through for radiating heat of human beings, further to avoid skin rash due to long pressure, bed sores or other symptoms.
3. The absorbing and dispersing layer has several positioning members, and the buffering layer and the positioning member are made by the same material, the buffering layer and the positioning member can be tightly combined, and non-toxic adhering agent is adapted to avoid pungent odor and environmental pollution.
4. Through the positioning members, the absorbing and dispersing layer may not be moved or deformed while in moving or coiling in order to be in the state of lamination.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims

What is claimed is:
1. A pad structure for absorbing vibration and dispersing pressure comprising:
 an absorbing and dispersing layer, a first surface of the absorbing and dispersing layer (1) being a closed surface, a second surface of the absorbing and dispersing layer being opposite to the first surface, at least one connecting hole being disposed on the absorbing and dispersing layer, the one end surface of the connecting hole being an opened surface and the other end surface being a closed surface;
 at least one positioning member, having an adhering surface that connects the positioning member into the connecting hole of the absorbing and dispersing layer, so that the one end surface of the positioning member is urged by the connecting hole, adhering agent being coated on the adhering surface;
 a buffering layer, having at least one connecting surface that connects with the second surface of the absorbing and dispersing layer and the adhering surface of the positioning member, so that the connecting surface and the adhering surface are tightly combined and then the absorbing and dispersing layer is fixed;
 a wrapping member, covering on the absorbing and dispersing layer (1) and the buffering layer as one member;
 a plurality of traverse flexible supporting walls and a plurality of longitudinal flexible supporting walls are dis- posed on the absorbing and dispersing layer and cross composed a frame member so as to have a plurality of cross points;

a first oblique flexible supporting wall and a second oblique flexible supporting wall being elongated from the frame member in order to cross compose a flexible supporting structure;

the first oblique flexible supporting wall and the second oblique flexible supporting wall are interlaced each other and pass through the cross point, a plurality of radiation holes being formed among the traverse flexible supporting walls, the longitudinal flexible supporting walls, the first oblique flexible supporting walls and the second oblique flexible supporting walls; and the adhering surface of the positioning member and the second surface of the absorbing and dispersing layer being on the same horizontal level, or the adhering surface being slightly protruded compared to the second surface.

2. The pad structure for absorbing vibration and dispersing pressure according to claim 1, wherein the cross point of the traverse flexible supporting wall, the longitudinal flexible supporting wall, the first oblique flexible supporting wall and the second oblique flexible supporting wall is round in order to be drawn from pattern.

3. The pad structure for absorbing vibration and dispersing pressure according to claim 1, wherein the absorbing and dispersing layer is a solid member.

4. The pad structure for absorbing vibration and dispersing pressure according to claim 1, wherein the adhering agent is water-soluble or non-toxic.

5. The pad structure for absorbing vibration and dispersing pressure according to claim 1, wherein the positioning member is selected from one or the composition of the group consisting of: foam, memory foam, high density foam, natural cotton and rayon.

6. The pad structure for absorbing vibration and dispersing pressure according to claim 1, wherein the buffering layer is selected from one or the composition of the group consisting of: foam, memory foam, high density foam, natural cotton and rayon.

7. The pad structure for absorbing vibration and dispersing pressure according to claim 1, wherein the wrapping member is selected from one or the composition of the group consisting of: woven fabric, knitted fabric, elastic real leather, artificial leather.

8. The pad structure for absorbing vibration and dispersing pressure according to claim 1, wherein the absorbing and dispersing layer is selected from one or the composition of the group consisting of: gel material, latex materials, silicone, soft rubber, synthetic rubber, soft plastic, and soft PU.

9. A pad structure for absorbing vibration and dispersing pressure comprising:

an absorbing and dispersing layer, a first surface of the absorbing and dispersing layer being a closed surface, a second surface of the absorbing and dispersing layer being opposite to the first surface, at least one connecting hole being disposed on and passed through the absorbing and dispersing layer, so that the two end surfaces of the connecting hole are opened surfaces;

at least one positioning member, which two end surfaces are adhering surfaces that connect the positioning member into the connecting hole of the absorbing and dispersing layer, so that adhering agent is coated on the adhering surfaces;

two buffering layers, having at least one connecting surface that connects with the second surface of the absorbing and dispersing layer and the adhering surface of the positioning member, so that the connecting surface and the adhering surface are tightly combined and then the absorbing and dispersing layer is fixed to form a sandwich structure;

a wrapping member, covering on the absorbing and dispersing layer (1)' and the buffering layers as one member;

a plurality of traverse flexible supporting walls and a plurality of longitudinal flexible supporting walls are disposed on the absorbing and dispersing layer and cross composed a frame member so as to have a plurality of cross points;

a first oblique flexible supporting wall and a second oblique flexible supporting wall being elongated from the frame member in order to cross compose a flexible supporting structure;

the first oblique flexible supporting wall and the second oblique flexible supporting wall are interlaced each other and pass through the cross point, a plurality of radiation holes being formed among the traverse flexible supporting walls, the longitudinal flexible supporting walls, the first oblique flexible supporting walls and the second oblique flexible supporting walls; and the adhering surface of the positioning member and the second surface of the absorbing and dispersing layer being on the same horizontal level, or the adhering surface being slightly protruded compared to the second surface.

10. The pad structure for absorbing vibration and dispersing pressure according to claim 9, wherein the cross point (16) of the traverse flexible supporting wall, the longitudinal flexible supporting wall, the first oblique flexible supporting wall and the second oblique flexible supporting wall is round in order to be drawn from pattern.

11. The pad structure for absorbing vibration and dispersing pressure according to claim 9, wherein the absorbing and dispersing layer is a solid member.

12. The pad structure for absorbing vibration and dispersing pressure according to claim 9, wherein the adhering agent is water-soluble or non-toxic.

13. The pad structure for absorbing vibration and dispersing pressure according to claim 9, wherein the positioning member is selected from one or the composition of the group consisting of: foam, memory foam, high density foam, natural cotton and rayon.

14. The pad structure for absorbing vibration and dispersing pressure according to claim 9, wherein the buffering layer is selected from one or the composition of the group consisting of: foam, memory foam, high density foam, natural cotton and rayon.

15. The pad structure for absorbing vibration and dispersing pressure according to claim 9, wherein the wrapping member is selected from one or the composition of the group consisting of: woven fabric, knitted fabric, elastic real leather, artificial leather.

16. The pad structure for absorbing vibration and dispersing pressure according to claim 9, wherein the absorbing and dispersing layer is selected from one or the composition of the group consisting of: gel material, latex materials, silicone, soft rubber, synthetic rubber, soft plastic, and soft PU.

* * * * *